United States Patent
Fought et al.

(10) Patent No.: US 11,072,272 B2
(45) Date of Patent: Jul. 27, 2021

(54) MOVABLE WALL STRUCTURE FOR A TRAVEL TRAILER

(76) Inventors: David Fought, Middlebury, IN (US); Martin Clanton, Goshen, IN (US)

(*) Notice: Subject to any disclaimer, the term of this patent is extended or adjusted under 35 U.S.C. 154(b) by 1106 days.

(21) Appl. No.: 13/507,528

(22) Filed: Jul. 5, 2012

(65) Prior Publication Data
US 2014/0008932 A1    Jan. 9, 2014

(51) Int. Cl.
*B60P 3/34*    (2006.01)
*B62D 63/08*    (2006.01)

(52) U.S. Cl.
CPC .............. *B60P 3/34* (2013.01); *B62D 63/08* (2013.01)

(58) Field of Classification Search
CPC .......... B60R 21/026; B62D 63/08; B60P 3/34
USPC ....... 296/24.4, 24.43, 24.45; 410/4, 77, 129, 410/130
See application file for complete search history.

(56) References Cited

U.S. PATENT DOCUMENTS

| | | | | |
|---|---|---|---|---|
| 1,646,604 A * | 10/1927 | Wells | ............................. | 119/415 |
| 2,752,864 A * | 7/1956 | McDougal, Sr. et al. | .... | 410/130 |
| 3,529,738 A * | 9/1970 | Hunt | .............................. | 414/502 |
| 4,049,311 A * | 9/1977 | Dietrich et al. | ............... | 410/138 |
| 4,080,906 A * | 3/1978 | Brown | .......................... | 410/130 |
| 4,161,145 A * | 7/1979 | Patterson et al. | ............. | 410/130 |
| 4,621,856 A * | 11/1986 | McKenzie | ................... | 296/24.4 |
| 4,701,086 A * | 10/1987 | Thorndyke | ..................... | 410/26 |
| 5,114,202 A * | 5/1992 | Johnson | ..................... | 296/26.05 |
| 5,472,300 A * | 12/1995 | Lipschitz | ...................... | 410/139 |
| 6,059,313 A * | 5/2000 | Coogan et al. | ................ | 280/749 |
| 6,547,298 B2 * | 4/2003 | Sotiroff et al. | ............. | 296/24.43 |
| 6,783,164 B2 * | 8/2004 | Bortell | ....................... | B60P 3/14 |
| | | | | 296/24.33 |
| 7,618,085 B1 * | 11/2009 | Bean | .............................. | 296/157 |
| 7,731,255 B2 * | 6/2010 | McJunkin | ..................... | 296/24.4 |
| 7,918,465 B2 * | 4/2011 | Metzger | ...................... | 280/6.153 |
| 7,942,465 B1 * | 5/2011 | Jefferson | ................... | B60P 3/36 |
| | | | | 296/168 |
| 2003/0141731 A1* | 7/2003 | Betts et al. | ................... | 296/24.1 |
| 2010/0096873 A1* | 4/2010 | Miller | ........................ | B60P 3/32 |
| | | | | 296/24.33 |
| 2011/0278873 A1* | 11/2011 | Schwindaman | .......... | B60P 3/34 |
| | | | | 296/26.13 |

FOREIGN PATENT DOCUMENTS

| | | | | |
|---|---|---|---|---|
| DE | 10204664 C5 * | 4/2010 | ............... | B60R 5/04 |
| EP | 1354760 A3 * | 12/2005 | ............... | B60P 3/42 |
| FR | 2810933 A1 * | 1/2002 | ............... | B60P 7/00 |
| FR | 2812591 A1 * | 2/2002 | ............... | B60N 2/36 |
| GB | 2459703 A * | 11/2009 | ............... | B60R 21/02 |

\* cited by examiner

*Primary Examiner* — Dennis H Pedder
(74) *Attorney, Agent, or Firm* — Ryan M. Fountain

(57) ABSTRACT

A travel trailer is provided having a wall therein which is selectively movable along the longitudinal length of the trailer so as to alter the relative dimensions of rooms within the travel trailer without altering the exterior appearance of the travel trailer. In a preferred embodiment of a toy hauler-type travel trailer, the rearward wall separating the garage portion of the trailer from the living quarters is movably mounted at each of its sides upon a motor driven gear. Each such gear is operated in a synchronized manner so as to engage a gear rack on each side of the wall to drive the wall forward or rearward, as desired by the user.

9 Claims, 3 Drawing Sheets

MOVABLE WALL STRUCTURE FOR A TRAVEL TRAILER

BACKGROUND OF THE INVENTION

The present invention relates to the construction of recreational vehicles, and, more particularly, the travel trailers, including fifth wheel and toy hauler-type travel trailers.

SUMMARY OF THE INVENTION

The present invention is for a travel trailer having a wall therein which is selectively movable along the longitudinal length of the trailer so as to alter the relative dimensions of rooms within the travel trailer without altering the exterior appearance of the travel trailer. In a preferred embodiment of a toy hauler-type travel trailer, the rearward wall separating the garage portion of the trailer from the living quarters is movably mounted at each of its sides upon a motor driven gear. Each such gear is operated in a synchronized manner so as to engage a gear rack on each side of the wall to drive the wall forward or rearward, as desired by the user.

DETAILED DESCRIPTION OF THE DRAWINGS

Figure 1:
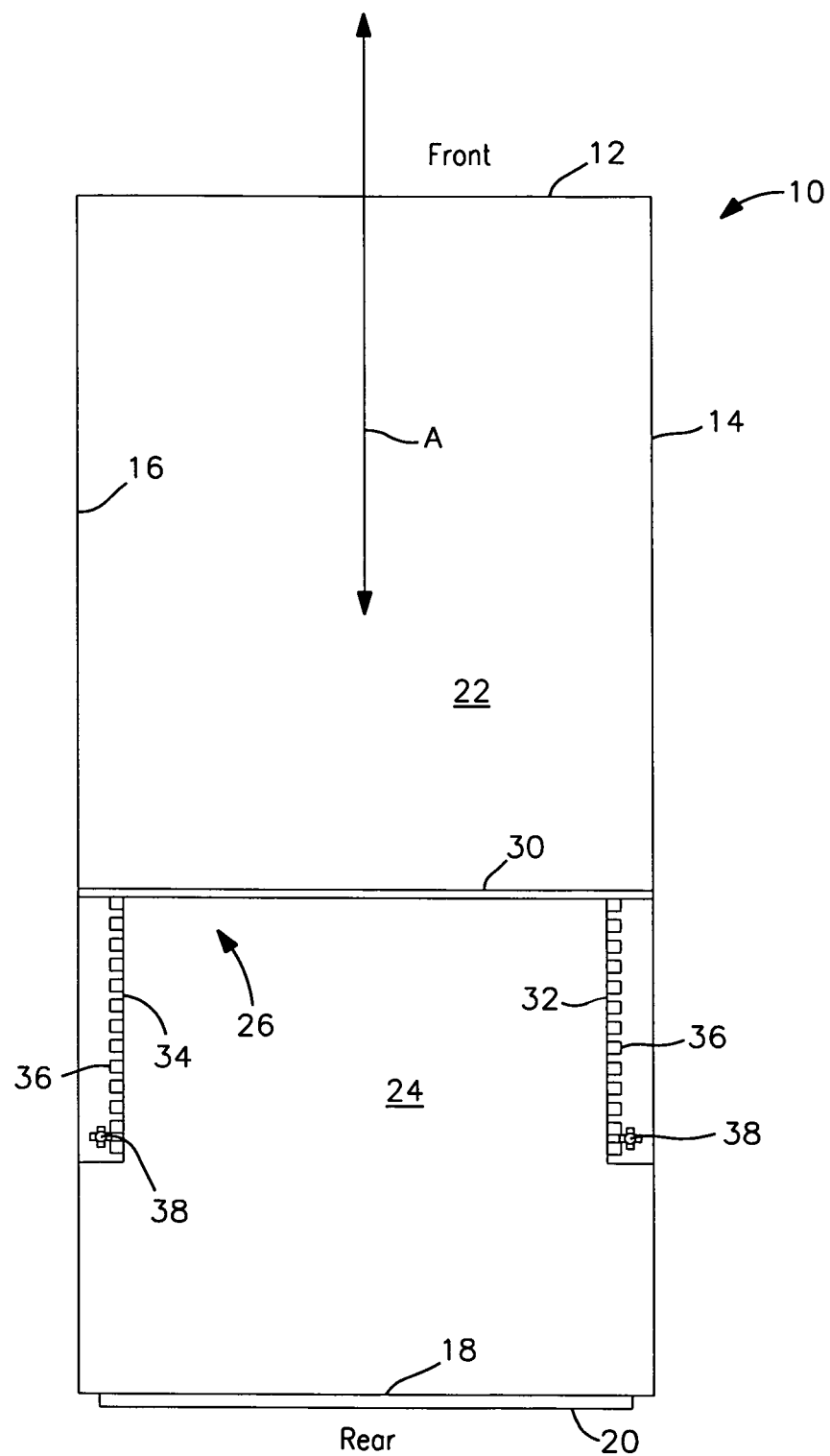
FIG. 1 shows a schematic top view of a travel trailer incorporating the present invention with the movable wall in a forward position and the ramp door raised.
Figure 2:
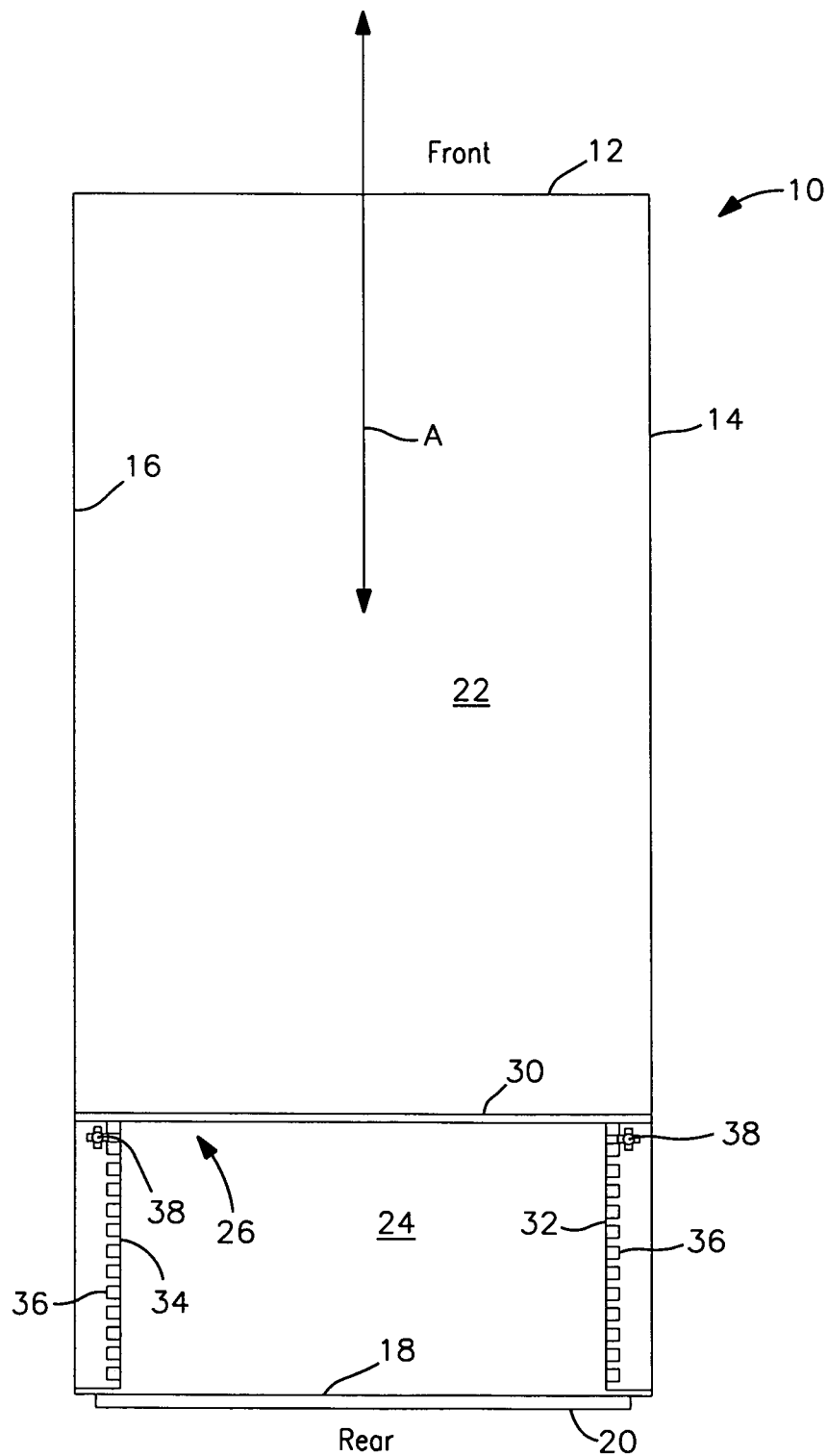
FIG. 2 shows a schematic top view of the travel trailer of FIG. 1 with the movable wall in a rearward position.

FIGS. 1 and 2 are schematic views showing a travel trailer 10 from a top view. The trailer has a front wall 12, side walls 14 and 16, and a rear wall 18. The longitudinal length of trailer 10 is along axis A. Trailer 10 is, for example, a toy hauler-type travel trailer, with a ramp door 20 hinged at rear wall 18, so as to be movable between raised and lowered positions which permit access to the interior of trailer 10.

In general, trailer 10 is divided into at least two compartments, 22 and 24. In a toy hauler-type travel trailer, for example, compartment 22 is the living quarters of the travel trailer, and compartment 24 is the garage portion where vehicles may be stored. These compartments are separated by wall assembly 26.

Wall assembly 26 is movable within trailer 10 along axis A from front to rear positions. Wall assembly 26 includes forward wall 30, and side walls 32 and 34, for example. Side walls 32 and 34 are movable along side and parallel to side walls 14 and 16, respectively. To accomplish that motion, each of side walls 32 and 34 includes a length of gear toothed racks 36 between it and the corresponding side walls 14 and 16. Racks 36 are fixed with respect to side walls 32 and 34. Racks 36 are each engaged by a drive means, such as a rotatable gear 38, each of which gears is, for example, driven by an electric motor (not shown in the figures). The electric motors are synchronized so that each operates in the same manner and at the same time. The motors and gears 38 are fixed with respect to side walls 14 and 16. The motors are controlled conventionally by the travel trailer users through remote or wall mounted switches (not shown in the figures) at any convenient location with respect to the trailer.

Rotation of gears 38 causes racks 36 to move along the longitudinal length of the trailer, forward or rearward according to the direction of rotation of the gears. Since side walls 32 and 34 are fixed with respect to racks 36, the entire wall assembly 26 is thereby moved forward or rearward. This allows the users to alter the relative portion of the trailer (if a toy hauler) which is available as a garage or as living quarters, as needed in a given application, without changing the exterior appearance of the trailer. Alternatively, for conventional travel trailers or non-toy hauler fifth wheel trailers, this allows the user to alter the relative dimensions of various different living quarters within the trailer.

Figure 4:
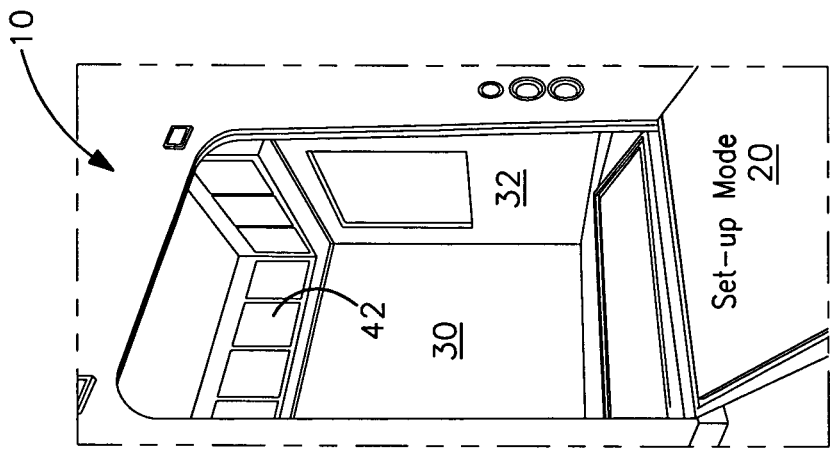
FIG. 4 shows a rear, left, perspective photographic view of the trailer of FIG. 3 with the movable wall in a rearward position.
Figure 3:
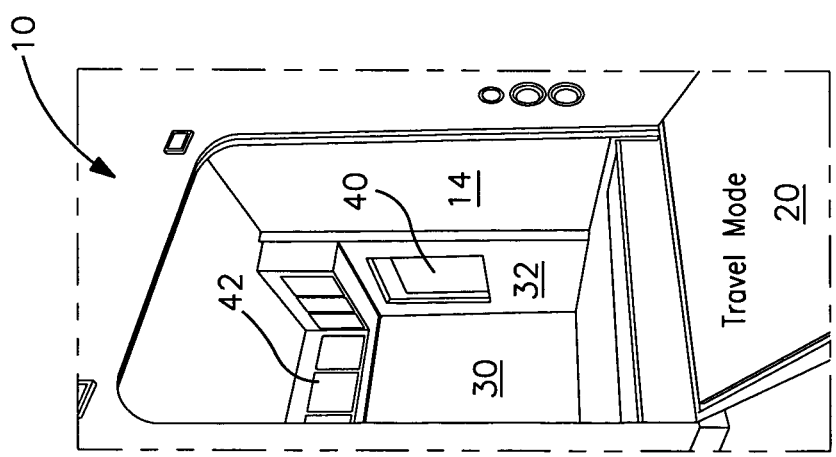
FIG. 3 shows a rear, left, perspective photographic view of a "best mode" travel trailer with the movable wall in a forward position and the ramp door lowered.

FIGS. 3 and 4 are included to show applications of the present invention to a best mode version of a toy hauler-type trailer, having additional features, such as windows 40 and cabinets 42 therein. The present invention can also be used in connection with a wide variety of travel trailer floor plans having a wide variety of living compartments and travel trailer features. Forward wall, 30, for example, may also include a door opening between the garage and the living quarters. Also, while a rack and drive gear assembly are illustrated for use in moving wall assembly 26 back and forth, other drive mechanisms are available using conventional devices, such as worm gear drives, hydraulic or pneumatic pistons, and the like. Preferably, those drive mechanisms are small enough and located conveniently so as to be out of sight with respect to the users, positioned between the walls as shown. Although the present invention has been described in detail herein with respect to certain structures, that is by way of illustration and example only. The spirit and scope of the present invention are limited only by the scope of the claims attached hereto.

What is claimed is:

1. A travel trailer having a front wall, rear wall, and two side walls with a first and a second compartment therein, those compartments being separated by a wall assembly,
    the wall assembly having a forward wall and at least one side member,
    the side member being located adjacent to and movable in parallel with respect to one of the side walls of the trailer, and
    the wall assembly being moved along the longitudinal length of the trailer by drive means positioned between the side member and the side wall.

2. A travel trailer having a first and second compartment therein separated by a wall assembly which is movable so as to alter the relative dimensions of the first and second compartments without altering the exterior appearance of the travel trailer, and wherein:
    the wall assembly is not fixedly connected to a fixture supported on the floor, for facilitating use of either compartment, and
    the wall assembly includes an undivided wall member which substantially spans an interior width of the travel trailer.

3. A travel trailer having a first and second compartment therein separated by a wall assembly which is movable so as to alter the relative dimensions of the first and second compartments without altering the exterior appearance of the travel trailer wherein:
    the wall assembly is not directly connected to any seating fixture within the travel trailer, which is movable between and first and second locations and which Imparts movement to the wall assembly, and the wall assembly includes a unitary wall structure which substantially spans an interior width of the travel trailer.

4. A travel trailer having a first and second compartment therein separated by a wall assembly which is movable so as to alter the relative dimensions of the first and second compartments without altering the exterior appearance of the travel trailer wherein the wall assembly includes at least two side walls, and a drive mechanism associated with each side wall, with operation of the drive mechanisms being synchronized when the wall assembly is moved.

5. The travel trailer according to claim 4 wherein each of the drive mechanisms includes a rack member and a drive gear member.

6. The travel trailer according to claim 5 wherein each side wall extends along the length of the travel trailer for a length sufficient to conceal from view within the travel trailer the rack member associated with that side wall.

7. The travel trailer according to claim 1 wherein the wall assembly has at least two such side members and said drive means are positioned between each side member and its associated side wall.

8. The travel trailer according to claim 7 wherein said drive means are synchronized with respect to their operation when the wall assembly is moved along the longitudinal length of the trailer.

9. The travel trailer according to claim 8 wherein said drive means include rack members attached to each side member, and each side member extends for a length sufficient to conceal from view within the travel trailer the rack member attached thereto.

* * * * *